United States Patent [19]
Gee et al.

[11] 3,913,948
[45] Oct. 21, 1975

[54] CONVERSION ARRANGEMENT FOR A DUMP TRUCK

[75] Inventors: James E. Gee, Washington; Alfred W. Sieving; David T. Ping, both of Decatur, all of Ill.

[73] Assignee: Caterpillar Tractor Co., Peoria, Ill.

[22] Filed: June 10, 1974

[21] Appl. No.: 477,761

[52] U.S. Cl. ...... 280/415 R; 280/415 B; 280/425 R; 280/154.5 R; 298/22 R
[51] Int. Cl.² ......................................... B62D 53/06
[58] Field of Search ........ 280/415 B, 415 A, 415 R, 280/425 R, 432, 438 R, 492, 154.5 R; 298/22 R

[56] References Cited
UNITED STATES PATENTS

| | | | |
|---|---|---|---|
| 2,138,679 | 11/1938 | Sherman | 280/438 R X |
| 2,151,640 | 3/1939 | Menning | 280/423 R X |
| 2,233,193 | 2/1941 | Armington et al. | 280/438 R X |
| 2,311,941 | 2/1943 | Gustafson | 280/154.5 R X |
| 3,355,043 | 11/1967 | Talbert | 280/425 R X |
| 3,360,281 | 12/1967 | Allen | 280/432 X |
| 3,498,639 | 3/1970 | Hawk | 280/492 |
| 3,552,798 | 1/1971 | Cole et al. | 298/22 R |

FOREIGN PATENTS OR APPLICATIONS

| | | | |
|---|---|---|---|
| 970,402 | 9/1964 | United Kingdom | 280/492 |

Primary Examiner—Leo Friaglia
Attorney, Agent, or Firm—Ralph E. Walters

[57] ABSTRACT

Provision is made for attaching a conversion unit to the chassis of an off-the-highway vehicle which has had a dump-type body removed. The conversion unit makes it possible to attach a semitrailer-type body to the vehicle. The conversion is effected without modifications to the vehicle chassis and includes a turn stop arrangement to prevent the semitrailer from bumping the cab of the vehicle on extreme turns. The conversion provides for fenders to prevent throwing rocks and hunks of dirt by the wheels and has a walking platform which permits ready access to operative parts of the conversion unit for inspection and repair.

10 Claims, 9 Drawing Figures

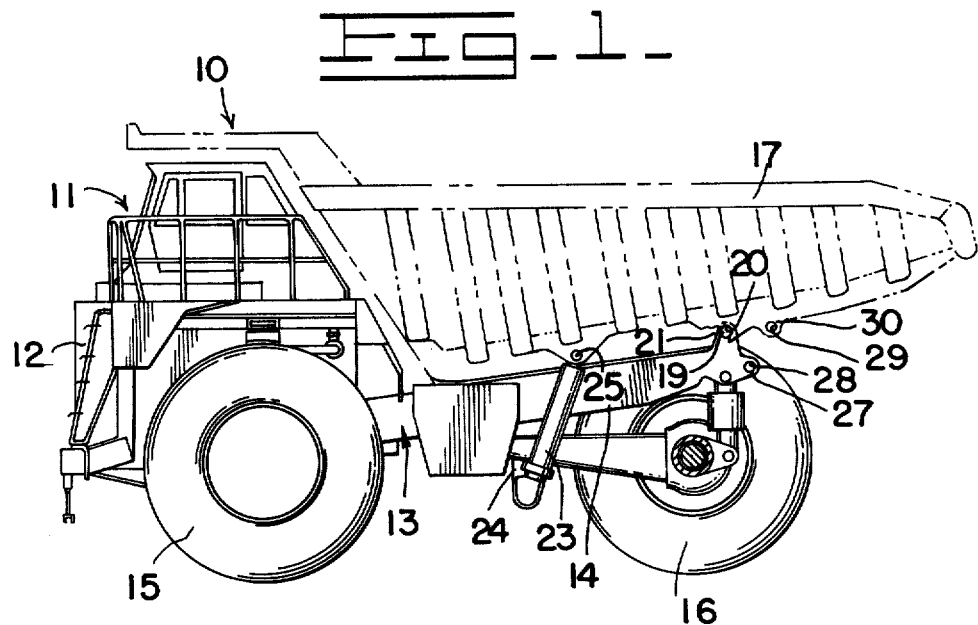
FIG-1-
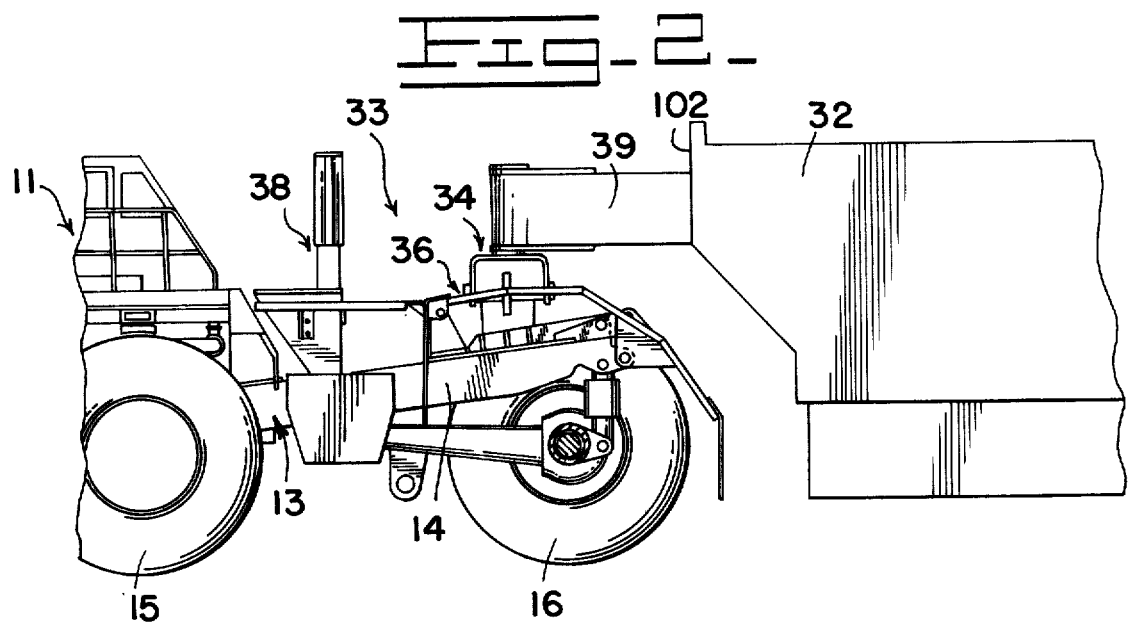
FIG-2-

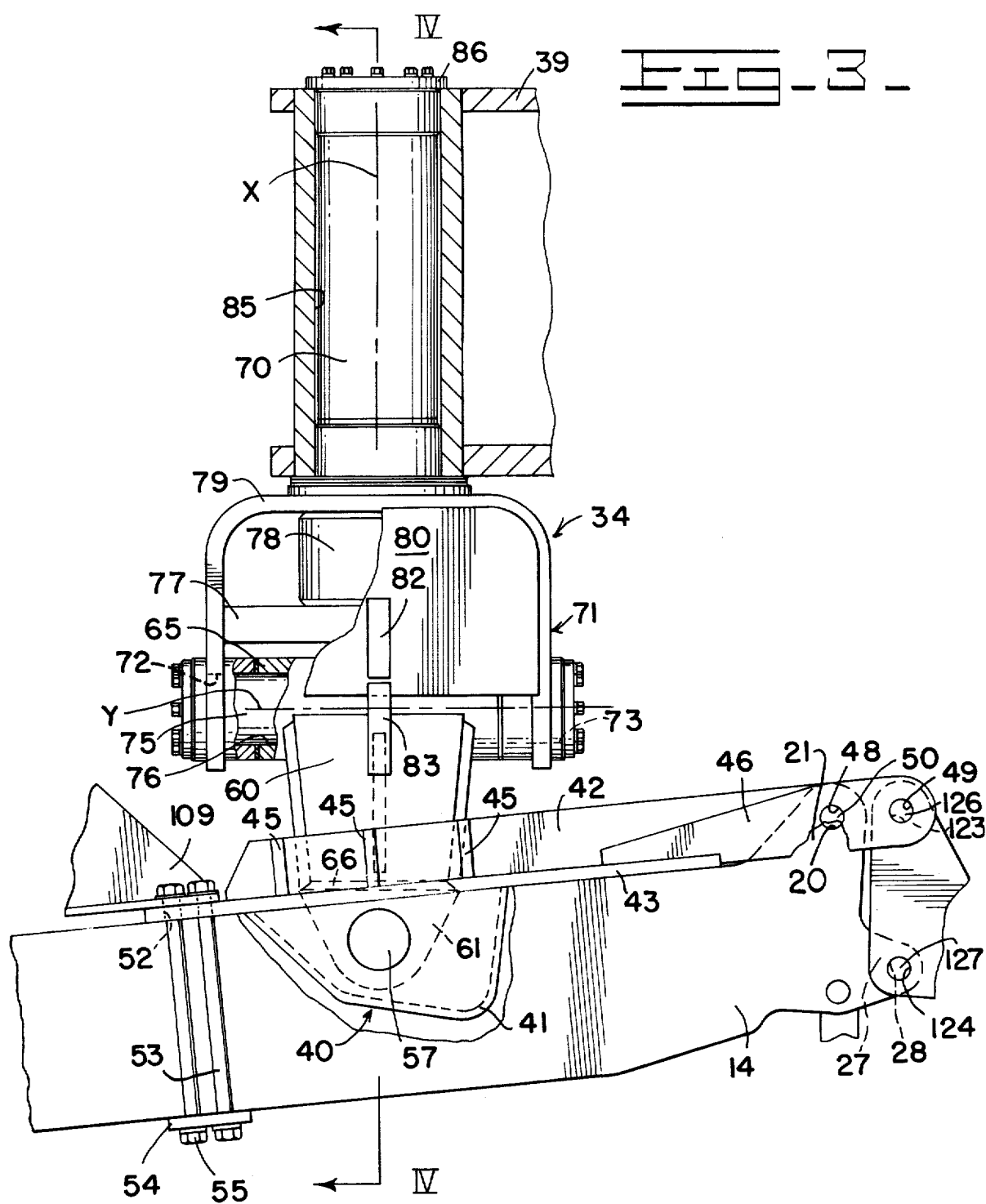

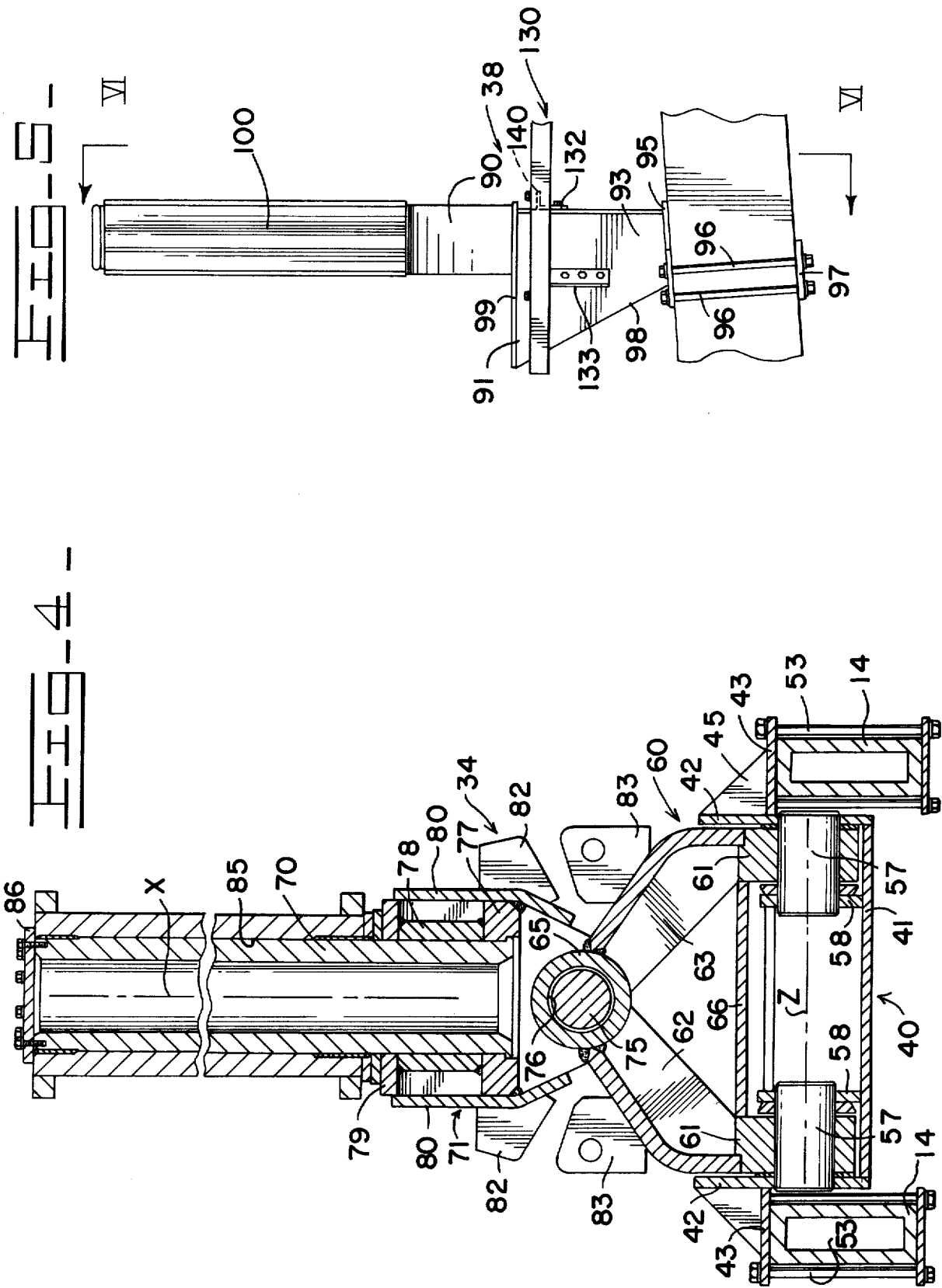

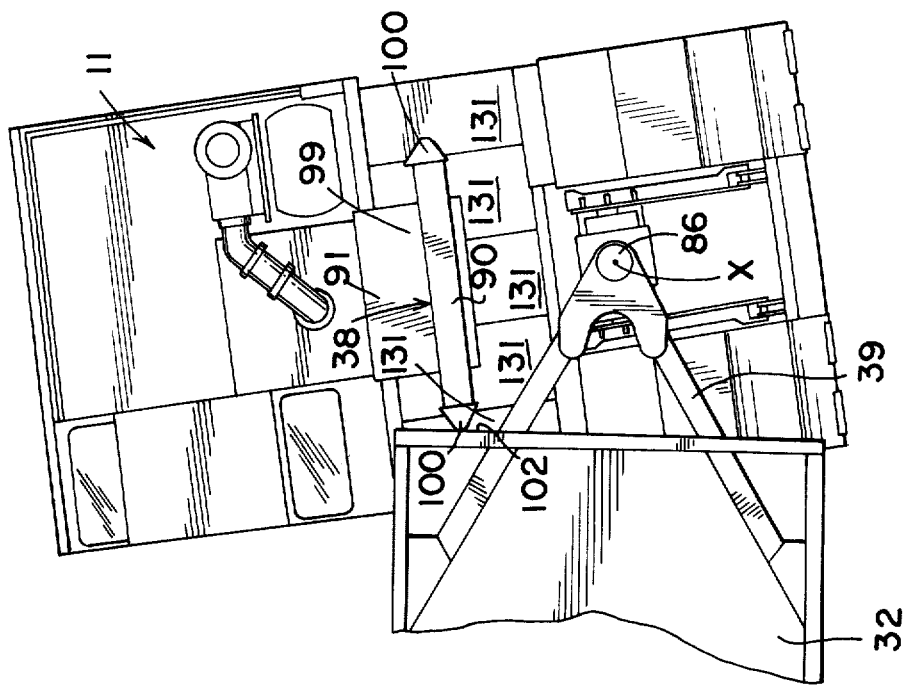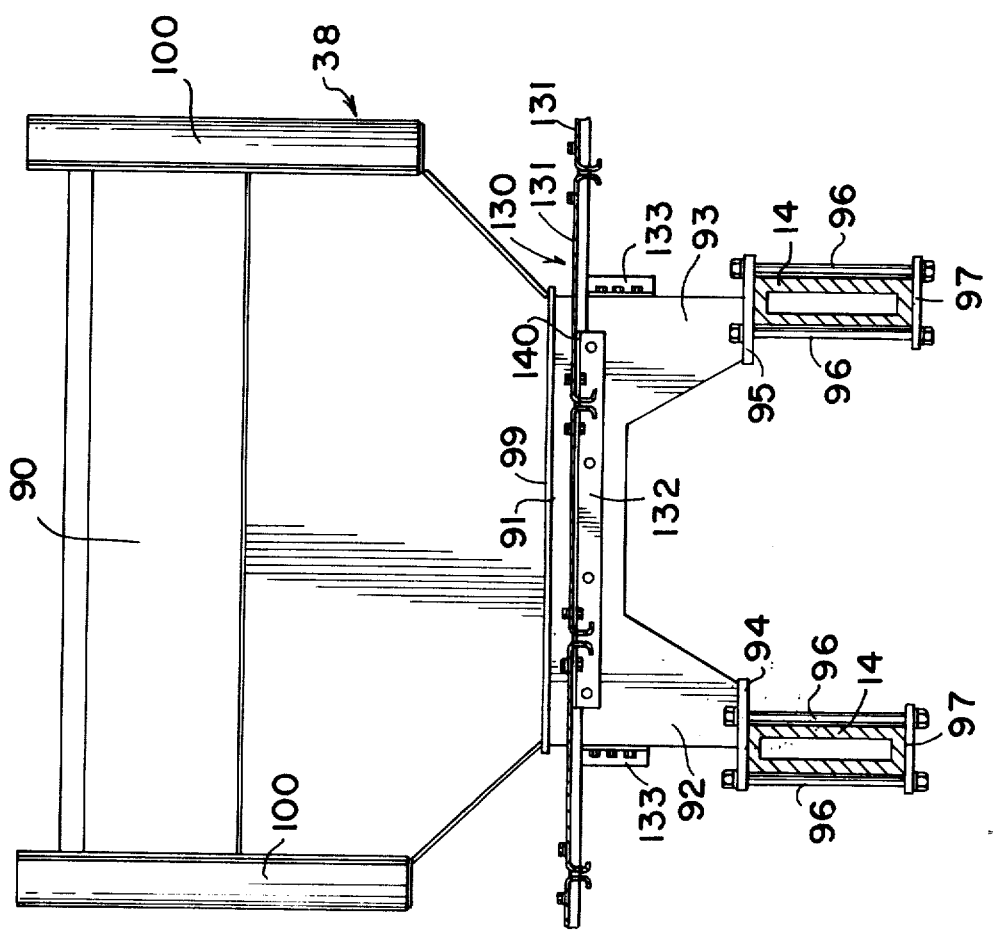

CONVERSION ARRANGEMENT FOR A DUMP TRUCK

BACKGROUND OF THE INVENTION

1. Field of the Invention

This invention relates to large off-the-highway vehicles and, more particularly, to a conversion unit for changing a dump truck to a tractor-trailer or the reverse.

2. Description of the Prior Art

Large off-the-highway vehicles having dump-type bodies are used to carry large loads of material from one location to another over very rough terrain such as in a quarry, on a construction site or the like. There are times when the dump-type body of the vehicle is not needed and yet there is a great need for vehicles capable of transporting materials in a different type body such as a semitrailer, a bottom dump wagon, a water wagon or the like. Heretofore, the dump-type body would be removed from the off-the-highway vehicle and by the use of cutting tools, welding torches and the like, the frame would be modified by the addition of a hitch, such as a fifth wheel member, to the truck chassis through which hitch the semitrailer can be attached to the vehicle.

Unfortunately, the modifications made to the vehicle chassis to convert the chassis for use with a semitrailer body is rather permanent and it has been found that to change the vehicle back for use as a dump-type truck, once again, requires extensive modification sometimes resulting in weakening the frame assembly if the reconversion can be completed at all.

It is known that conversion units are available for converting over-the-road trucks to over-the-road tractor-trailer-type vehicles by mounting a fifth wheel to the pickup truck chassis. However, the conversion of the over-the-road pickup truck is limited to a particular type of frame and necessitates some modification of the truck chassis.

SUMMARY OF THE INVENTION

Large off-the-highway dump truck-type vehicles can be converted by removing the dump truck body and by an appropriate bracketing arrangement, an articulated trailer hitch assembly is removably mounted to the vehicle chassis such that a semitrailer can be attached to the hitch for movement by the vehicle.

Fenders are provided for both sides of the vehicle to prevent objects from flying from the wheels of the vehicle and hitting the vehicle and the semitrailer. The fenders are removably attached by using some of the openings in the chassis vacated by the attaching means for holding the dump-type truck body to the vehicle. A catwalk or platform is likewise provided on the chassis to permit personnel to adjust and service the hitch assembly from a convenient height.

A bumper or turn stop assembly is likewise removably mounted to the vehicle frame in a position to engage the semitrailer body in the event the semitrailer body swings too far about the vertical axis of the hitch. The bumper or turn stop assembly prevents contact between the semitrailer and the cab of the vehicle.

The conversion unit, fenders, platform and turn stop assemblies can be readily removed whereupon the dump-type body can be reinstalled on the chassis of the vehicle without modifications.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a partial elevational view of a vehicle with a dump-type body attached thereto;

FIG. 2 is a partial elevational view of the same vehicle as shown in FIG. 1 only with the trailer hitch conversion unit, fenders, platform and turn stop installed on the chassis with a semitrailer-type body attached to the hitch;

FIG. 3 is an enlarged partial elevational view of the trailer hitch assembly attached to the vehicle frame;

FIG. 4 is a cross-sectional view taken along the lines 4—4 of FIG. 3;

FIG. 5 is an enlarged partial elevational view from the side of the bumper or turn stop assembly mounted on the vehicle frame;

FIG. 6 is a view taken along the lines 6—6 of FIG. 5;

FIG. 7 is a reduced sized top view of a portion of the vehicle and a portion of the semitrailer showing the relative location of the turn stop with respect to the semitrailer;

DESCRIPTION OF THE PREFERRED EMBODIMENT

Figure 8:
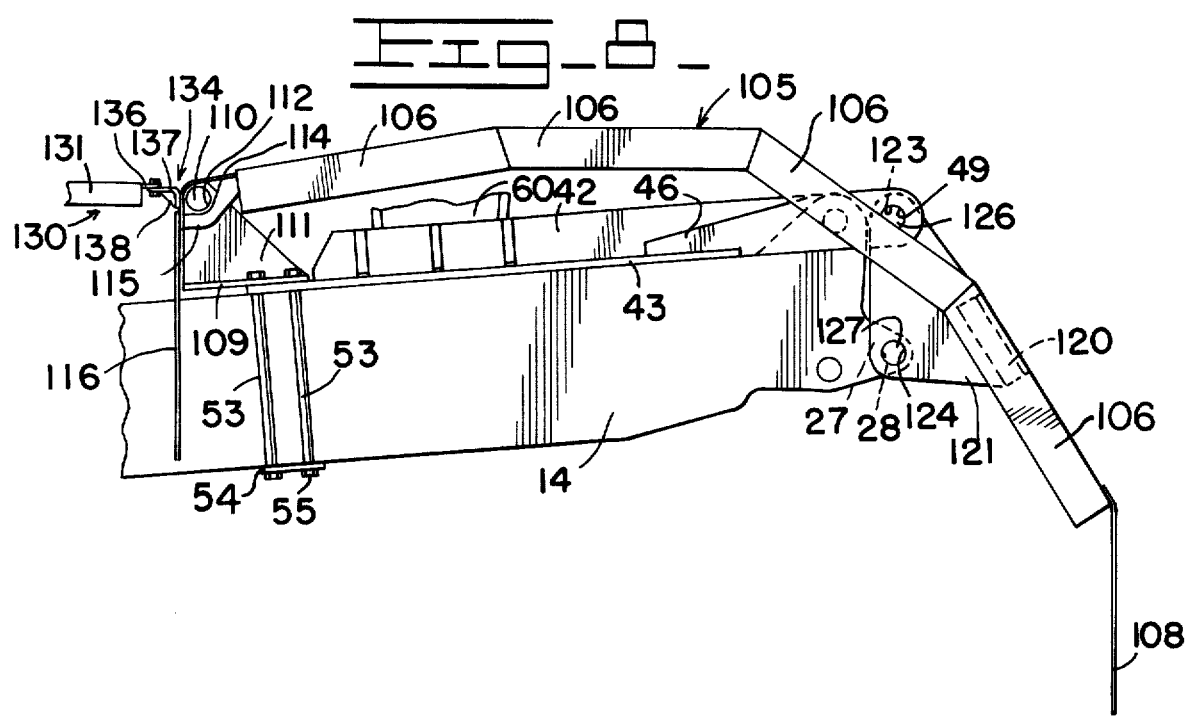
FIG. 8 is an enlarged elevational view of the fender assembly with parts broken away.

Referring in particular to FIG. 1 of the drawings, a relatively large off-the-road or off-the-highway dump truck 10 is illustrated and includes a tractor 11 having a cab 12 mounted upon a chassis 13. The chassis 13 has a pair of spaced apart side frame members 14 and is supported by a pair of front wheels 15 and rear wheels 16. The vehicle or tractor 11 is powered by an engine (not shown) through a drive line (not shown) connected to the wheels. A relatively large dump truck body 17 is pivotally mounted on the truck chassis 13 by means of pins 19 passing through openings 20 formed in the reinforced ears 21 on the respective side frame members 14. A pair of hydraulic actuators 23 are mounted on each side of the chassis 13 with one end of each actuator supported on an extension 24 on the truck chassis 13 and the other end mounted by means of pins 25 to the dump truck body 17 forward of the pivoted pins 19. An additional reinforced ear 27 extends rearwardly from each side frame member 14 and has an aperture 28 therethrough and which aperture 28 aligns with apertures 29 in the ears 30 formed on the bottom edges of the dump-type body 17. A pin is inserted through the aligned apertures 28 and 29 to hold the dump-type body 17 in raised position.

On those occasions when the dump-type body 17 is not needed, but wherein the tractor 11 is needed for moving a semitrailer-type body, such as a bottom dump wagon, a water wagon or the like, it is desirable to be able to remove the dump-type body 17 from the chassis 13 and apply a conversion unit to the chassis 13 making it possible to connect the semitrailer body to the tractor 11. The conversion unit is relatively simple in construction and in method of attachment to the chassis so that the chassis need not be modified during the conversion. In this way, when it is desired to reconvert the tractor-semitrailer body combination back to a tractor-dump-type body combination, the conversion unit can be removed and the dump-type body 17 reinstalled on the chassis 13.

FIG. 2 illustrates the tractor 11 converted for use for hauling a semitrailer-type body 32 such as a bottom dump wagon or the like. The conversion unit or arrangement 33 includes a hitch assembly 34 removably mounted on the side frame members 14 of the chassis 13. A fender and platform assembly 36 and a turn stop assembly 38 are likewise removably attached to the side frame members 14 on the chassis 13 whereupon when a gooseneck 39 of the semitrailer 32 is attached to the hitch assembly 34, a tractor-semitrailer combination results.

The conversion either from a tractor-dump-type body combination to a tractor-semitrailer-type body combination or the reverse, is performed by the use of ordinary tools found in a regular mechanic's toolbox. Special welding equipment and special modification tools are not required to install or remove the conversion unit.

Referring to FIGS. 3 and 4, the hitch assembly 34 comprises a mounting platform 40 which has a box-shaped depending portion 41 extending between the side frame members 14 with a pair of vertical side walls 42 connected thereto and projecting above the tops of said side frame members. Each side wall 42 has a sidewardly projecting flange or arm portion 43 attached thereto and adapted to rest on the top wall of said side frame member 14. reinforcing ribs 45 are welded between said wall 42 and said flange or arm portion 43 to add rigidity to said platform 40. The rearward end portion of each wall 42 has an overlapping plate 46 secured to the arm portion 43 in spaced apart relation (see FIG. 9) with said wall 42. The wall 42 has a pair of spaced apart apertures 48, 49 aligned with a similar pair of spaced apart apertures 48, 49 in the plate 46. In securing the mounting platform 40 to the frame members 14, the forward-most pair of apertures 48 are aligned with the aperture 20 in the reinforced ear 21 of the side frame member 14 and through which aligned apertures 48,48, 20 extends a pin 50 for retaining the rearward portion of the mounting platform 40 on the side frame members 14. The plates or arm portions 43 extend forward of the upwardly projecting walls 42 and have on each side thereof a pair of openings 52 through which two bolts 53 extend on each side of each frame member 14 and are bolted to tie plates 54 drawn up against the bottom of the side frame members 14 by nuts 55 threaded on said bolts. In the just described manner, the mounting platform 40 is securely fastened to the frame members 14 of the chassis 13 without modifying the chassis 13 or frame members 14 at all.

A pair of stub shafts or pivot pins 57 are secured in the side walls 42 of the box-shaped portion 41 and project axially toward each other between the spaced apart side frame members 14. The pivot pins 57 have a common longitudinal axis Z. The inner end portions of the shafts or pins 57 are supported by support walls 58 carried by said box-like portion 41. A saddle support 60 has a pair of enlarged bearing portions 61 encircling said stub shafts or pins 57 with two shaped halves 62, 63 of said support 60 fastened to said bearing portions 61 and extending upwardly and inwardly from said bearing portions for attachment to the sides of an elongate tubular bearing member 65. The tubular member 65 has an axis Y extending generally transverse to and spaced from the longitudinal axis Z of the stub shafts or pins 57. A wall 66 is fastened between the bearing portions 61 to support said bearing portions in fixed spaced apart relationship. The halves 62, 63 have an inverted U-shape in cross section to add rigidity to said saddle support 60.

An upright kingpin 70 is rigidly attached to the center of a bifurcated yoke 71 which yoke 71 has aligned apertures 72, 73 therethrough. The bifurcated yoke 71 straddles the tubular member 65 of the saddle support 60 with said aligned apertures 72, 73 in alignment with the opening 76 in the tubular member. A pivot pin 75 passes through the apertures 72, 73 in the yoke 71 and through the opening 76 in the tubular member 65 so that the bifurcated yoke and kingpin together can pivot about the longitudinal axis Y of the pivot pin 75. The lower end portion of the kingpin 70 is anchored in the plate 77 within the bifurcated yoke 71 with a spacer 78 positioned between the plate 77 and the base 79 of the yoke 71. Cover plates 80 are attached to each side of said yoke 71 and have inturned lower end portions conforming to the shape of the yoke. The cover plates 80 of the yoke 71 have a pair of radially, outwardly extending stop members 82 on opposite sides thereof, which stop members 82 are adapted to align with a pair of stop members 83 radially, outwardly extending from the opposite sides of the saddle support 60. With the kingpin 70 and its longitudinal axis X in the straight up position, the stop members 82 on each side of the bifurcated yoke 71 are spaced from the stop members 83 on each side of the saddle support 60 an equal amount so that as the kingpin 70 and yoke 71 pivot relative to the saddle support 60, the extent of pivotal movement about the longitudinal axis Y of the pivot pin 75 is limited by contact between one aligned pair of said stops 82, 83.

The gooseneck 39 on the forward end of the semitrailer 32 has a vertical opening 85 which is adapted to receive the upright kingpin 70 of the hitch assembly 34. To prevent ready removal of the gooseneck 39 from the kingpin 70, a retaining plate 86 which has overlapping edges extending beyond the circumferential wall of the kingpin 70 is bolted to the upper end of the kingpin 70. The end plate 86 holds the gooseneck 39 on the hitch assembly 34.

With the gooseneck 39 of the semitrailer 32 secured to the hitch assembly 34, the vertical axis X of the kingpin 70 coincides with the vertical axis of the opening 85 of the gooseneck. The axis X of both the kingpin 70 and opening 85 of the goosenck 39 is fixed with respect to the semitrailer 32, so that any tilting, pitching or yawing of the semitrailer 32 will move the kingpin 70 with the same identical movements. The saddle support 60 will pivot about the longitudinal axis Z of the pins 57 while the kingpin 70 and yoke 71 will pivot about the longitudinal axis Y of the pin 75. As the tractor 11 moves over rough terrain, the chassis 13 and frame 14 will pitch and tilt and yaw such that the hitch assembly 34, through the universal-type connection created by the transverse pivot axes Y and Z, will transmit the pulling (or pushing) forces from the tractor to the semitrailer 32. It is not uncommon due to the rough terrain to have the tractor pitching and tilting in one direction while the semitrailer 32 is pitching and tilting in the opposite direction. However, with the present universal-type hitch assembly, the moving forces from the tractor are transmitted to the semitrailer.

The turn stop assembly 38 is removably secured to the chassis 13 at an appropriate location between the hitch assembly 34 and the cab 12 of the vehicle or tractor 11. As is best shown in FIGS. 5, 6 and 7, the turn stop assembly 38 is comprised of an elongate vertically disposed fabricated support structure 90 having a base support member 91 which base member 91 includes a pair of joined together box-like leg portions 92, 93 welded onto a pair of spaced apart foot plates 94, 95 The plane of the foot plates is disposed at a slight angle to the plane of the support structure 90 to accommodate for the slight angling of the frame 14 with respect to the horizontal. The foot plates 94, 95 bear against the top of the spaced apart side frame members 14 with each plate secured to the frame by means of two pairs of spaced apart bolts 96 passing through the foot plate and through a tie plate 97 which tie plate 97 is drawn up against the bottom of the side frame member 14. The leg portions 92, 93 are connected together near the upper portions thereof and are box-shaped with the forward walls 98 sloping in such a way that the box is wider at its junction with a top wall 99 than at the bottom or foot plate 94 or 95 as viewed from the side (see FIG. 5). The fabricated support structure 90 has a pair of vertically extending bumpers 100 connected on the opposite side edges thereof which bumpers 100 are adapted to engage the front wall 102 of the semitrailer 32 during excessive turning of the tractor 11 relative to the semitrailer 32. It has been found in general, as is shown in FIG. 7, that the turn stop assembly 38 should be located on the chassis 13 in such a position that the pivoted end of the gooseneck 39 of the semitrailer 32 can pivot about the axis X of the kingpin 70 a total of about 202° from one extreme position to the other. That is, assuming a longitudinal axis of the tractor 11 and semitrailer 32, the semitrailer 32 can pivot about the vertical axis X of the kingpin 70 approximately 101° on each side of said longitudinal axis before contacting one or the other bumper 100. The bumpers 100 can be made of rubber, plastic or other appropriate material.

Figure 9:
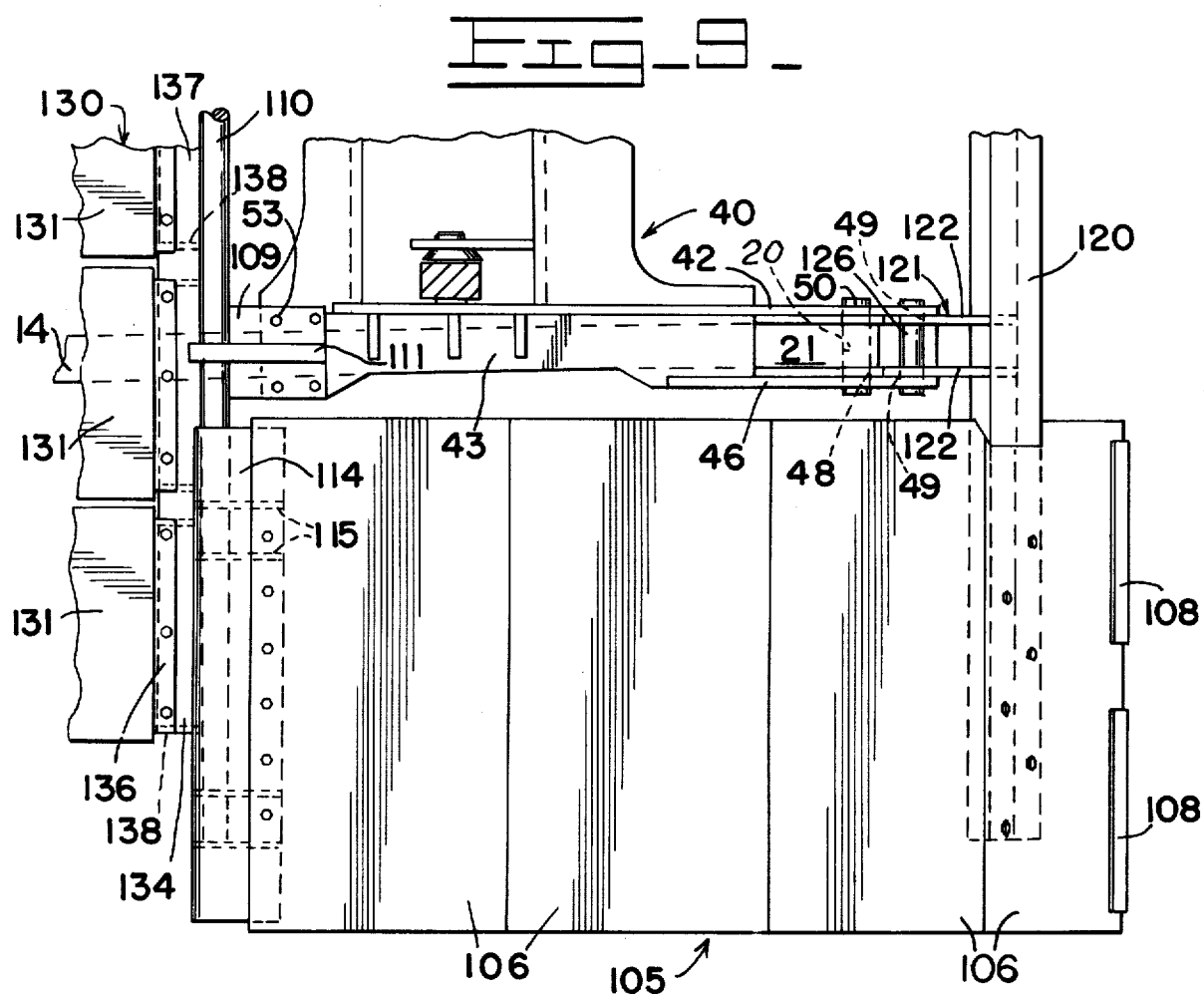
FIG. 9 is a plan view of one side of the fender assembly of FIG. 8 and immediately adjacent parts of the vehicle chassis.

A fender and platform assembly 36 is provided for the vehicle or tractor 11 when it is being used with a semitrailer 32, and, as is best shown in FIGS. 8 and 9, when considered together with FIGS. 3 and 4, a pair of fenders 105 are illustrated with each fender 105 consisting of several horizontal segments 106. Each segment 106 forms a slight angle with respect to the adjacent segment 106 so as to form an arcuately-shaped cover for the rear wheels of the vehicle. A downwardly depending, flexible member 108 is attached to the rearmost edge of the last segment 106 of each fender 105 to form additional rock and splash guards for the wheels.

The front end portions of the fenders 105 are attached to the frame 14 of the chassis 13 by means of two forwardly disposed brackets 109 bolted on the frame and supporting a transversely held rod 110 secured by means of brackets to the fenders 105. Specifically, the forward brackets 109 are bolted to the side support frames 14 by the same bolts 53 that are used to bolt the mounting platform 40 to the frame. Each forward bracket 109 has an upstanding flange 111 which has an opening 112 therethrough for receiving the transverse rod 110. The forward-most segment 106 of each fender 105 has one leg of an L-shaped bracket 114 riveted or bolted thereto with the unattached leg of the L-shaped projecting downwardly therefrom. Several braces 115 extend between and are fastened to the insides of the legs of the L-shaped bracket 114 leaving an opening at the junction of the L for receiving the end portions of the rod 110. The rod 110 is fastened securely to the fenders 105 by said bracket 114 for supporting the forward end portions of said fenders relative to the chassis. A rock or splash plate 116 is secured to the depending leg of the L-shaped bracket 114 for deflecting objects flying from the rear wheels of the tractor.

The rear end portions of the fenders 105 are attached to the frame 14 by means of two triangularly-shaped brackets 121 pinned to the frame and supporting a transversely held bar 120 secured to said fenders 105. Specifically, the rearmost segment 106 of each fender 105 is riveted to the opposite end portions of the elongate transverse bar 120. Attached to the bar 120 inboard of each fender is one of the two-sided triangularly-shaped brackets 121 which brackets 121 are attached to the frame members 14. Each of the triangularly-shaped brackets 121 has two spaced apart sides 122 with the two corners of each side remote from the connection to the bar 120 having apertures 123 and 124 therethrough. The apertures 124 align with the aperture 28 in the ear 27 on the frame member 14 and the other apertures 123 align with the apertures 49 in the extension plate 46 and in the aperture 49 in the wall 42 of the mounting platform 40. Pins 126 are affixed in the aligned apertures 123, 49 and pins 127 are affixed in aligned apertures 124, 28 to support the brackets 121, bar 120 and rear portions of the two fenders 105 on the chassis. The rod 110 and bar 120 are each attached at each end portion to the two fenders 105 so as to suspend said fenders in position over the rear wheels.

A walking platform 130 consisting, as illustrated, of five sections 131, is provided for an operator to maneuver on the rear of the vehicle or tractor forward of the hitch assembly 34. The walking platform 130 is connected at its forward end to brackets 132, 133 attached to the base support member 91 of the turn stop assembly 38 and is attached at the rear end to a bracket 134 attached to the transverse rod 110 supporting the forward ends of the fenders 105. Each of the five separate steel sections 131 has a rearward extension 136 (FIGS. 8, 9) which is fastened as by rivets to the top wall 137 of the angled bracket 134 with the other wall of said bracket 134 being fastened to the downwardly projecting leg of the L-shaped bracket 114 for the fenders 105. Angled braces 138 support the two walls of said angled bracket 134 apart. The three central sections 131 of the forward end of platform 130 is supported on the extending wall 140 of the bracket 132 which bracket is attached to the rear wall of the base support 91. A pair of brackets 133 are attached one to each side of the base support 91 with outwardly projecting portions for supporting the two outermost sections 131 of the platform. The walking platform 130 is located below the area where the gooseneck 39 on the semitrailer 32 would interfere in the event the semitrailer 32 moves into a tight angled position with respect to the cab of the vehicle.

From the above description, it can be readily seen that a dump-type body 17 may be removed or replaced on the frame 14 of the chassis 13 of a tractor or vehicle 11. With the dump-type body removed, a conversion unit 33 having a hitch assembly 34 can be bolted and pinned to the frame without modifying the frame structure. The turn stop assembly 38 and the fender and platform assembly 36 likewise can be bolted to the frame without modifying the frame structure. The tractor 11 with the hitch assembly, turn stop assembly 38 and the fender and platform assembly 36 is now ready for use in hauling semitrailer-type bodies such as a bottom dump wagon, a water wagon or the like. To reconvert the tractor 11 for use with the dump-type body, the fender and platform assembly 36 is first removed and then the turn stop assembly and hitch assembly are unbolted and removed. The dump-type body is reinstalled and the vehicle is back in service as a dump truck, all without modification of any structures. Simple tools are used for the conversion which can be accomplished in a minimum amount of time.

We claim:

1. In a tractor-type off-the-highway vehicle having an operator cab mounted on a chassis, fore and aft wheels rotatably mounted on said chassis, an engine and drive train connected to said wheels for propelling said vehicle over rough terrain, in combination with means for converting said wehicle from use as a dump truck to use as a tractor for a semitrailer, said means comprising a mounting platform secured to said chassis after the dump-type body has been removed, said mounting platform having a support portion extending between parallel side frame members of said chassis, flange means on the ends of said support portion and resting on said side frame members, means for securing said flange means to said side frame members, a pair of inwardly projecting aligned stub shafts carried by said support portion, a saddle support pivotally mounted on said stub shafts, a tubular member carried by the opposite end of said saddle support and having an axis extending transverse to the axis of said stub shafts, a vertically disposed kingpin having downwardly extending yoke means straddling said tubular member, a pivot pin passing through said yoke means and said tubular member for pivotally mounting said kingpin for movement about the axis of said tubular member, and a gooseneck member on said semitrailer encircling said kingpin for movement about the vertical axis of said kingpin.

2. In a vehicle as claimed in claim 1 wherein said yoke means and said saddle support have aligned stop means to limit the amount of pivotal movement of the kingpin about the axis of the tubular member.

3. In a vehicle as claimed in claim 1 wherein each side of one end portion of said flange means being secured to said side frame members by means of tie bolts and tie plates straddling said side frame members and wherein each side of the other end portion of said flange means being secured to said side frame members by means of pivot pins engaging in openings in said side frame members previously used to secure said dump-type body to said chassis.

4. In a tractor-type off-the-highway vehicle having an operator cab mounted on a chassis, for and aft wheels rotatably mounted on said chassis, an engine and drive train connected to said wheels for propelling said vehicle over rough terrain, in combination with means for converting said vehicle from use as a dump truck to use as a tractor for a semitrailer, said means comprising a mounting platform secured to said chassis after the dump-type body has been removed, a pair of inwardly projecting aligned stub shafts carried by said platform, a saddle support pivotally mounted on said stub shafts, a tubular member carried by the opposite end of said saddle support and having an axis extending transverse to the axis of said stub shafts, a vertically disposed kingpin having downwardly extending yoke means straddling said tubular member, a pivot pin passing through said yoke means and said tubular member for pivotally mounting said kingpin for movement about the axis of said tubular member, a gooseneck member on said semitrailer encircling said kingpin for movement about the vertical axis of said kingpin, means for preventing said semitrailer from bumping the cab of said vehicle, said means comprising a turn stop having a support structure with two depending legs removably bolted to said frame, and bumper means mounted on the sides of said support structure in position to be engaged by the front of said semitrailer upon excessive turning motion between the vehicle and semitrailer.

5. A vehicle as claimed in claim 1 wherein fender members for the aft wheels are connected by fastening means to said chassis, some of said fastening means passing through holes in the frame used previously to secure the dump-type body to the frame and other of said fastening means passing through openings in said mounting platform.

6. A dual use vehicle having an operator cab mounted on a frame, fore and aft wheels rotatably mounted on the frame, an engine and drive train connected to said wheels for propelling said vehicle over the terrain, and conversion means for attachment to a portion of said frame for changing said vehicle from use as a dump truck to use as a semitrailer, said conversion means comprising a mounting platform having a depending portion extending between opposite sides of said frame, means on said depending portion engaging with and being bolted to said sides of said frame, a pair of inwardly projecting aligned stub shafts carried by said depending portion, a saddle support pivotally mounted on said stub shafts, said saddle support having a tubular member having an axis lying in a plane above said stub shafts with said axis extending transverse to the axis of said stub shafts, a vertically disposed kingpin having a bifurcated yoke pivotally attached to said saddle support by means of a pivot pin passing through said tubular member and said bifurcated yoke, and a gooseneck member on the semitrailer encircling said kingpin whereby said semitrailer may pitch, roll and yaw relative to the vehicle as they both traverse rough terrain.

7. A dual use vehicle having an operator cab mounted on a frame, fore and aft wheels rotatably mounted on the frame, an engine and drive train connected to said wheels for propelling said vehicle over the terrain, and conversion means for attachment to a portion of said frame for changing said vehicle from use as a dump truck to use as a semitrailer, said conversion means comprising means for bolting a mounting platform to said frame, said platform having a pair of inwardly projecting aligned stub shafts, a saddle support pivotally mounted on said stub shafts, said saddle support having a tubular member above said stub shafts with an axis extending transverse to the axis of said stub shafts, a vertically disposed kingpin having a bifurcated yoke pivotally attached to said saddle support by means of a pivot pin passing through said tubular member and said bifurcated yoke, a gooseneck member on the semitrailer encircling said kingpin whereby said semitrailer may pitch, roll and yaw relative to the vehicle as they both traverse rough terrain, means for preventing said semitrailer from bumping the cab of said vehicle, said means comprising a turn stop having two legs removably bolted to said frame, a support structure carried by said legs and extending sidewardly parallel to the cab of the vehicle, and vertically disposed sidewardly facing bumper means mounted on the sides of said support structure in position to be engaged by said semitrailer upon excessive turning motion between the vehicle and said semitrailer.

8. A vehicle as claimed in claim 6 wherein fender members for covering the wheels are connected by fastening means to said frame, at least some of said fastening means being connected in holes in the frame used to secure the dump-type body to the frame.

9. A vehicle as claimed in claim 6 wherein stop members on the opposite sides of the bifurcated yoke are aligned with and spaced from stop members on the opposite sides of the saddle support to limit the pivoting of the kingpin about the longitudinal axis.

10. In a tractor-type off-the-highway vehicle having an operator cab mounted on a chassis, fore and aft wheels rotatably mounted on said chassis, an engine and drive train connected to said wheels for propelling said vehicle over rough terrain, in combination with means for converting said vehicle from use as a dump truck to use as a tractor for a semitrailer, said means comprising a mounting platform having a depending portion with outwardly extending flange means, means for bolting said flange means to spaced apart frame members of said chassis after the dump-type body has been removed, pivot means carried by said depending portion, a saddle support pivotally mounted on said pivot means, elongate means on said saddle support spaced from said pivot means and having an axis extending transverse to and lying in a plane spaced above the axis of said pivot means, and a vertically disposed kingpin having downwardly extending yoke means pivotally mounted on said elongate means on said saddle support to permit pivotal movement of said kingpin about the axis of said elongate means on said saddle support.

* * * * *